June 11, 1968 M. ETTER 3,388,310
CIRCUIT ARRANGEMENT FOR EXTINGUISHING CONTROLLED
RECTIFIERS IN AN INVERTER
Filed Jan. 17, 1966 2 Sheets-Sheet 1

INVENTOR
MARCEL ETTER

BY
ATTORNEYS

INVENTOR
MARCEL ETTER

United States Patent Office 3,388,310
Patented June 11, 1968

3,388,310
CIRCUIT ARRANGEMENT FOR EXTINGUISHING CONTROLLED RECTIFIERS IN AN INVERTER
Marcel Etter, 6 Blvd. des Promenades, Geneva, Switzerland
Filed Jan. 17, 1966, Ser. No. 520,983
Claims priority, application Switzerland, Feb. 23, 1965, 2,470/65
5 Claims. (Cl. 321—5)

ABSTRACT OF THE DISCLOSURE

An inverter is disclosed as including a source of D.C. potential, a pair of input connectors connected to the source, and plurality of line breaker units connected across the input conductors. Each unit has at least two branches, and each branch is constituted by a main controlled rectifier and an auxiliary controlled rectifier connected in series, with opposed polarity relationship, at a respective junction point. Means are provided to produce simultaneously a transient reversal of the voltage across the units and the ignition of an auxiliary rectifier resulting in extinction of the corresponding main rectifier in series therewith. Each unit has a phase output connected to the junction points of the main rectifiers with the corresponding auxiliary rectifiers and, through these junction points, alternately with each terminal of the source of potential through the then energized main rectifier. Means are further provided controlling the periodical sequence of ignition of the main rectifiers in the different units.

Background of the invention

Figure 1:
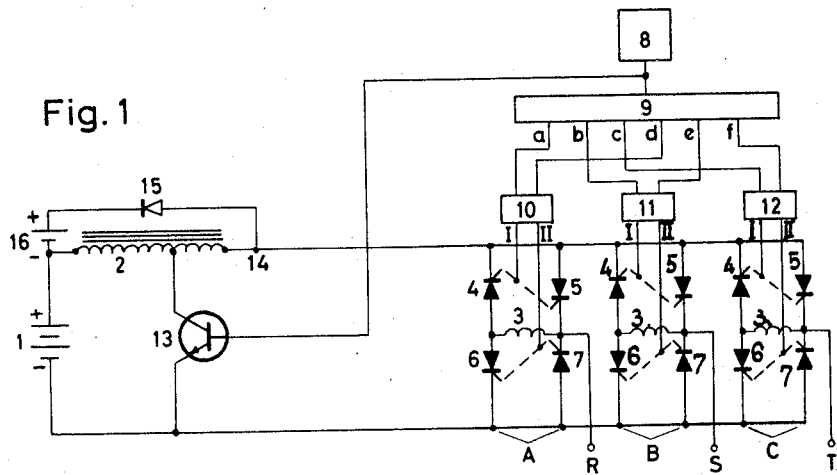

There are known inverters which include at least two blocks, or line breaker units, constituted each by at least two main controlled rectifiers, while each block is connected, on the one hand, with both terminals of a D.C. supply and, on the other hand, with a phase output, which latter may be connected as desired with either terminal of said D.C. supply through one or the other of said controlled rectifiers, and said blocks are connected in parallel with said D.C. supply. It is sufficient to provide a circuit adapted to reverse transiently the voltage across the terminals of said blocks, and to provide also a diode connected in series in opposite polarity relationship with each rectifier and connected with the other terminal of the block, so as to feed the rectifier with an extinguishing current of a reversed direction.

Inverters of such a type are described in copending U.S. patent application Ser. No. 301,063, issued May 23, 1967 as U.S. Patent No. 3,321,697. They are of interest since they provide, through simple means, the simultaneous extinction of all the conductive rectifiers.

However, the extinguishing circuit has to supply a comparatively intense current which is higher than twice the maximum current to be provided by the inverter. The elements of the extinguishing circuit are thus of a large bulk and are comparatively expensive. On the other hand, the controlled rectifiers are necessarily extinguished all simultaneously and consequently there is observed, during the operation, extinctions and reignitions which are more numerous than is required and this leads to increased losses through switching.

The present invention has for its object to allow, in an inverter of the type disclosed, the extinction of only a number of the rectifiers while retaining a single extinguishing circuit. This leads to a reduction in the current required for extinguishing and therefore in the size of the circuit which is to supply said current. Furthermore, the losses through switching are reduced.

The inverter forming the subject of the present invention has the novel feature that each block includes at least two auxiliary controlled rectifiers the conductivity of which is controlled, each of said auxiliary rectifiers being inserted in series with one of the main rectifiers between the two points feeding D.C. into the corresponding block while the polarity of each auxiliary rectifier is opposed to that of the main rectifier associated with it and the phase output of a block is connected with the points connecting the cooperating main and auxiliary rectifiers of said block. The extinction of one of the main rectifiers connecting the phase output with one of the terminals of the D.C. supply is obtained through the ignition of the auxiliary rectifier element connected in series with it and through a simultaneous transient reversal of the voltage across the terminals of the blocks, said reversal being produced by the extinguishing circuit.

The accompanying drawing illustrates, diagrammatically and by way of example, two embodiments and various modifications of the inverter forming the subject of the invention.

Figure 2:
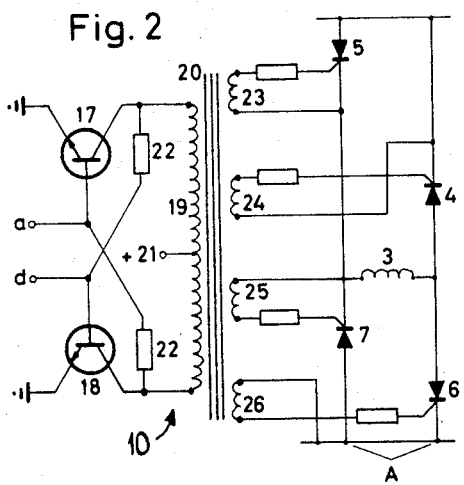
Figure 4:
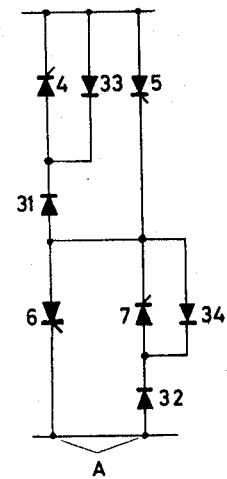
Figure 3:
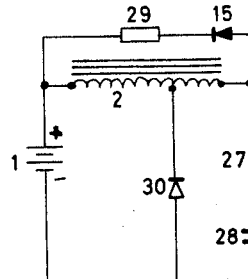
Figure 5:
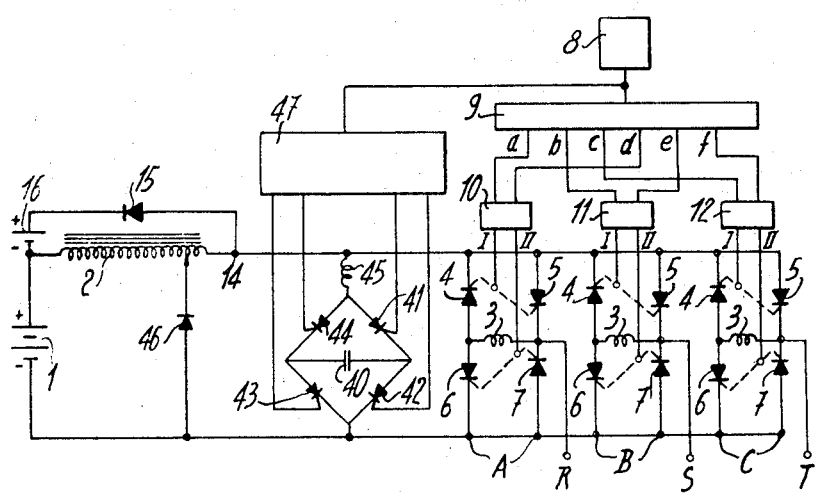

FIG. 1 is a simplified diagram of a first embodiment;
FIG. 2 illustrates a detail of the diagram according to FIG. 1;
FIG. 3 illustrates a second embodiment;
FIG. 4 illustrates a modification of this second embodiment;
FIG. 5 relates to a modification of the embodiment illustrated in FIG. 1.

The inverter illustrated in FIG. 1 includes a D.C. supply 1 illustrated as a battery, although it may as well be constituted by any conventional supply of electrical energy such as a rectifier fed with A.C. Said supply 1 feeds, through the agency of an induction coil 2 and a pair of input conductors, a plurality of blocks, or line breaker units, such as three thereof, shown at A, B and C. Each line breaker unit is connected across the input conductors, and each unit has at least two branches. Each branch is constituted by a main controlled rectifier 5 or 6 and an auxiliary controlled rectifier 7 or 4, the controlled rectifiers in each branch being connected in series, with opposed polarity relationship, at a respective junction point. Thereby, the polarity of each auxiliary rectifier is opposed to that of its associated main rectifier.

The two points connecting a main rectifier with an auxiliary rectifier are interconnected by an induction coil 3.

One of the ends of the induction coil 3 of each block A, B, C is connected with a phase output R, S or T respectively. However, the operation would not be modified if the phase outputs R, S and T were tapped off an intermediate point of each induction coil 3.

The inverter illustrated in FIG. 1 is adapted to supply a three-phase current of a rectangular shape and it is monitored by an arrangement including a pulse generator 8 feeding a ring counter 9. The latter distributes the pulses received from the generator 8 in succession to each of six outputs designated as $a, b, c, d, e, f$. When a pulse has been fed to an output $f$, the following pulse is again fed to the output $a$ and the cycle begins over again. The outputs $a$ and $d$ are connected with a flip-flop 10 while the outputs $b$ and $e$ are connected with a flip-flop 11 and the outputs $c$ and $f$ are connected with a flip-flop 12.

Each of the flip-flops 10, 11 and 12 is provided with two outputs I and II. The output I provides a signal controlling the ignition of the rectifiers 4 and 5 of the block corresponding to the flip-flop considered, whereas the output II supplies a signal controlling the ignition of the rectifiers 6 and 7 of each block. Each flip-flop supplies a signal to one of its outputs as soon as it has received a pulse at one of its inputs and, at the moment at which it receives a pulse on its second input, it supplies an output signal on its second output, the first output carrying then no signal.

In each of the blocks A, B and C, the two rectifiers 4 and 5 first receive a signal which provides for their conductivity for a predetermined duration, after which the signal is applied to the rectifier elements 6 and 7 for a same duration. Then, the cycle begins over again so that alternatingly one of the rectifiers 4, 5 and then one of the rectifiers 6 and 7 becomes conductive.

If the load provided on the three-phase output is of a purely ohmic character, only the main rectifiers 5 and 6 feed the three-phase output current. However, if the load is constituted by an inductive or a capacitive impedance, the auxiliary rectifiers 4 and 7 also feed the phase current.

Each time the generator 8 supplies a pulse, one of the flip-flops 10, 11 or 12 changes its condition. Simultaneously with said change of condition, the pulse from generator 8 is fed to an electronic switch 13 constituted, for instance, by a transistor connected between an intermediate point of the induction coil 2 and the negative terminal of the supply. As a result of the closing of said switch 13, the output point 14 of the induction coil 2 is suddenly brought to a voltage which is more negative than that of the negative terminal of the battery 1. The induction coil 2 acts, as a matter of fact, as an autotransformer, the primary of which is constituted by the fraction of the coil extending between the positive pole of the battery 1 and the collector of the transistor 13.

The amplitude of the overvoltage arising in the induction coil 2 as a consequence of each extinction is limited by a diode 15 connected, in series with a supply 16, across the coil 2.

Assuming that a pulse applied on the output $a$ of the distributor 9 has produced a signal at the output I of the flip-flop 10, the rectifiers 4 and 5 will have received an ignition signal. According to the conditions prevailing in the circuit and the voltage at the output R with reference to that of the supply 1, either the rectifier 4 or the rectifier 5 serves for feeding the current. Generally, the load is of an inductive character and the voltage at the phase output R is higher than that of the positive terminal of the supply 1, at the beginning of the positive half-period of the voltage, the current in the supply being then reactive, after which said voltage decreases or decays for the remainder of the half-period. Consequently, the auxiliary rectifier 4 begins conveying the current, following which the main rectifier 5 becomes conductive in its turn.

When the distributor 9 supplies a pulse through the output $d$, the flip-flop 10 changes its condition and supplies a voltage through its output II. Simultaneously with the application of the pulse through the output $d$ to the flip-flop 10, a pulse is tapped off the output of the generator 8 and feeds the base of the transistor 13 so as to render the latter conductive. There is thus obtained a reversal of the voltage across the terminals of the blocks A, B and C during the passage of said pulse as a consequence of the autotransformer action of the coil 2. At the same time, the rectifiers 6 and 7 receive their ignition signal. Said signal has no action on the main rectifier 6 since the polarity of the latter is opposed to that of the current which is to be conveyed by it. In contradistinction, the auxiliary rectifier 7 becomes conductive and supplies a current which passes through the main rectifier 5 in the opposite direction whereby the extinction of said main rectifier is obtained within a very short time, of a magnitude of 15 to 20 microseconds.

As soon as the pulse applied to the transistor 13 is at an end, the voltage across the terminals of the blocks A, B and C returns to its normal value and the auxiliary rectifier 7 of the block A continues being conductive until the current in the phase R changes its polarity and the point R becomes more positive than the negative terminal of the supply 1. The rectifier 7 thus extinguishes and the rectifier 6 of the block A becomes conductive since its gate or control electrode still receives the signal II of the flip-flop 10 so that it can connect the phase R with the negative pole of the supply 1.

During the following change of the condition of the flip-flop 10, the output signal is again applied at I, which provides the ignition pulse for the rectifiers 4 and 5. At the same time, the transistor 13 becomes conductive, which reverses again the voltage across the terminals of the blocks A, B and C. The current produced by the reversed voltage passes then through the rectifiers 6 and 4 until the load on the main rectifier 6 is cut out which leads to an extinction of said main rectifier. As soon as the pulse on the transistor 13 is at an end, the voltage of the phase R becomes again positive, but the auxiliary rectifier 4 remains conductive as long as the current is of a reactive nature, after which the main rectifier 5 becomes again conductive.

It may occur, according to the operative conditions and chiefly when a motor operates transiently as a generator, that the condition of the flip-flop 10 changes and an extinction signal appears while current passes through an auxiliary rectifier, whereby the signal produces the ignition of the other auxiliary rectifier. The induction coils 3 have for their object to prevent, in such a case, any short circuiting of the negative extinction voltage as a consequence of the simultaneous ignition of both auxiliary rectifiers of a same block. Otherwise, such a short-circuit might damage the electronic switch 13. As soon as the voltage becomes again positive across the terminals of the bridge, the main rectifier is ignited again and produces the extinction of the auxiliary rectifier which was conductive just before the extinction signal.

FIG. 1 illustrates very diagrammatically the control of the rectifiers 4 to 7 by a flip-flop of the type illustrated at 10, 11 and 12. FIG. 1 does not take into account the voltage differences to be observed between the control electrodes of the controlled rectifiers 4 and 5, respectively 6 and 7.

FIG. 2 shows the detail of the control of the block A by the flip-flop 10. Said flip-flop includes two transistors 17 and 18 of the NPN type of which the emitters are grounded and their collectors are connected respectively with the corresponding ends of a winding 19 of a transformer 20. The medial tapping 21 of the winding 19 is connected with the positive terminal of a supply of electric energy. The collector of each transistor is connected with the base of the other transistor through a resistance 22. Said transistor bases are fed with the negative locking pulses from outputs $a$ and $d$ of the distributor 9.

The transformer 20 includes four secondary windings 23, 24, 25 and 26 supplying the voltages controlling the conductivity of the rectifiers 5, 4, 7 and 6 respectively. A resistance is connected in series with each of said windings so as to limit the current which may be applied to the control electrode.

FIG. 3 illustrates a second embodiment including again the supply 1, the induction coil 2 and the rectifiers 4, 5, 6 and 7 in each of the blocks A, B and C. Each of said blocks supplies the desired current to the corresponding phase R, S or T.

In this embodiment, the extinguishing current is supplied by an oscillating circuit including an induction coil 27 and a condenser 28 inserted in series across the leads feeding the blocks A, B and C. The limitation of the overvoltages in the coil 2 is obtained by a diode 15 inserted in series with a resistance 29 across the terminals of the induction coil 2. In embodiment, the circuit controlling the ignition of the rectifiers 4 to 7 in the three blocks A, B and C has not been illustrated, but it may be of the same type as that described with reference to FIG. 1. Turning to the block A, assume that its rectifier 5 is conductive and an ignition signal is fed to the rectifiers 6 and 7. This produces a short-circuit through the rectifiers 5 and 6. Such a short-circuit produces an oscillating discharge of the condenser 28 into the winding 27 and the discharge current, after one-half period of oscillation, is reversed and passes through the rectifiers 7 and 5 in the opposite direction, which provides for an extinction of the main rectifier 5. The current in the phase R is then supplied through the auxiliary rectifier 7 and then, when the sign of the current changes, through the main rectifier 6. After extinction, the condenser 28 is loaded again to the voltage of the supply 1 and consequently the circuit is ready to control a further extinction.

When a further signal controlling conductivity is applied to the rectifiers 4 and 5, the ignition of the main rectifier 5 produces a further short-circuit of the oscillating circuit 27, 28 through the rectifiers 5 and 6. The oscillating discharge current of the condenser 28 produces again, after one-half period, a current of a reverse direction in the main rectifier 6, which extinguishes the latter. The current passes then through the auxiliary rectifier 4 and later through the main rectifier 5 so as to feed the phase R.

It should also be remarked that in the embodiment illustrated in FIG. 3, an intermediate point of the induction coil 2 is connected with the negative pole of the supply 1 through a diode 30. The latter has for its object to limit the voltage of a reversed direction which appears across the terminals of the blocks A, B and C during the oscillating discharge of the condenser 28 after extinction of the main rectifier 5 or 6.

FIG. 4 illustrates diagrammatically a block, such as A for instance, wherein the auxiliary rectifiers 4 and 7 are constituted by elements which can carry only a low blocking voltage and which are consequently cheaper than the main rectifiers 5 and 6. In order to allow the corresponding line section to carry high voltages which may be applied to it, in the opposite direction, said elements 4 and 7 are connected in series with the corresponding diodes 31 and 32 adapted to carry such a high voltage in the opposite direction.

In order to cut out any high reversed voltage being applied to the rectifiers 4 and 7, each of the latter is bridged by a diode of an opposite polarity 33 or 34 respectively. Obviously, according to a modification, said diodes 33 and 34 may be replaced by simple resistances.

The proper distribution of the voltages between the rectifier 4 and the diode 31 and between the rectifier 7 and the diode 32 may also be ensured by the conventional method resorting to resistances and condensers.

FIG. 5 is a modification of the inverter illustrated in FIG. 1, in which modification the extinguishing current is no longer obtained through the agency of the induction coil 2 and of the power transistor 13, but through the discharge of a condenser 40 inserted in a bridge of controlled rectifiers 41, 42, 43 and 44. Said arrangement is connected through the agency of an induction coil 45 with the leads feeding the blocks A, B and C.

As in the case of FIG. 3, the voltage of a reversed direction which may appear across the terminals of the blocks A, B and C during the discharge of the condenser 40 is limited by a diode 46 inserted between the negative pole of the supply 1 and an intermediate point of the induction coil 2.

In order to produce in one of the blocks A, B or C the extinction of the controlled rectifiers, the extinguishing current is supplied by the discharge of the condenser 40 which had been precedingly loaded by the supply 1 whereby the rectifiers 41 and 43, for instance, were made conductive. In such a case, the extinguishing current is supplied by providing conductivity of the rectifiers 42 and 44 whereby the condenser 40 is connected across the terminals of the blocks A, B and C with a polarity opposed to that of the supply 1. When the condenser 40 has supplied the discharge current, its polarity is reversed and it assumes, through the agency of the diodes 42 and 44, a voltage which is substantially equal to the sum of the voltages of the supplies 1 and 16. When a further extinction is to be obtained, the rectifiers 41 and 43 are rendered conductive, which has again for its result to connect the condenser 40 in opposed voltage relationship across the blocks A, B and C.

Thus, at each extinction, the polarity of the condenser 40 is reversed, which condenser is then ready to produce the next extinction, without it being necessary first to load said condenser with a voltage of an opposite direction before obtaining the extinguishing pulse, as is the case, for instance, of the embodiment illustrated in FIG. 3. Consequently, the power, measured in volt-amperes, of the condenser 40 may be lower than that of the condenser 20 of FIG. 3 for a same extinguishing power. Said wiring diagram allows a speedier operation than that of FIG. 3, since, as soon as the condenser 40 is connected across the terminals of the blocks A, B and C, the extinguishing current may begin to flow.

In the wiring diagram illustrated in FIG. 5, it is necessary to ignite two well defined rectifiers during one extinction and two other rectifiers during the next extinction. For this reason, the pulses controlling the extinction currents, which are supplied by the generator 8, are sent into a circuit 47 including a flip-flop adapted to assume two positions for the control of the ignition of the rectifiers 41 to 44. At each pulse, the flip-flop reverses its condition, which allows without any other difficulty obtaining an alternating succession of ignitions of the rectifiers 41 and 43 on the one hand, and of the rectifiers 42 and 44 on the other hand.

As far as the control of the blocks A, B and C is concerned, the circuit of FIG. 5 is similar to that of FIG. 1.

Obviously, it is possible to provide further and different modifications and, in particular, the ignition of the auxiliary rectifiers may be independent of the ignition of the main rectifiers. Such a modification would simplify the stopping of the inverter, since it would be sufficient in this case to cut off completely the ignition of the main rectifiers while maintaining the ignition of the auxiliary rectifiers.

In the case of the embodiment illustrated in FIG. 3, it should be remarked that the auxiliary and main rectifiers may be grouped two by two in parallel and be replaced by semi-conductive elements the conductivity of which may be controlled for each direction of passage of the current. Such elements are known under the registered trade names Biswitch and Triac.

I claim:

1. An inverter comprising, in combination, a source of D.C. potential; a pair of input conductors connected to said source; a plurality of line breaker units connected across said input conductors, each unit having at least two branches and each branch being constituted by a main controlled rectifier and an auxiliary controlled rectifier connected in series, with opposed polarity relationship, at a respective junction point; means producing simultaneously a transient reversal of the voltage across said units and the ignition of an auxiliary rectifier resulting in the extinction of the corresponding main rectifier in series therewith; a phase output for each unit connected with the junction points connecting each main rectifier and its corresponding auxiliary rectifier and, through these junction points, alternately with each terminal of said source through the then energized main rectifier; and means controlling the periodical sequence of ignition of the main rectifiers in the different units.

2. In an inverter, as claimed in claim 1, an induction coil connected in one of said input conductors between one terminal of said source and the corresponding terminals of said units and provided with an intermediate tapping, and a semi-conductor element inserted between said intermediate tapping and the other terminal of said source.

3. In an inverter as claimed in claim 2, wherein said semi-conductor element is a diode connected in a normally non-conductive direction with respect to said source to limit the voltage at the terminals of the units.

4. In an inverter as claimed in claim 1, an induction coil connected in one of said input conductors between one terminal of said source and the corresponding terminal of the units and provided with an intermediate tapping, an electronic switch connected between said intermediate tapping and the other terminal of said source, and a circuit controlling said electronic switch to render it conductive whenever a main rectifier is to be extinguished thereby to insure the transient reversal of the voltage across the units.

5. In an inverter as claimed in claim 1 a control system for the ignition producing means and adapted to operate simultaneously in each unit, the ignition of one auxiliary rectifier and of the main rectifier connected with the same terminal of said source.

References Cited

UNITED STATES PATENTS

| | | | |
|---|---|---|---|
| 3,176,211 | 3/1965 | Linn | 321—45 XR |
| 3,207,974 | 9/1965 | McMurray | 321—45 |
| 3,213,287 | 10/1965 | King | 307—71 |
| 3,219,905 | 11/1965 | Davis et al. | 321—8 |
| 3,229,179 | 1/1966 | Hetzel | 318—138 |
| 3,262,036 | 7/1966 | Clarke et al. | 318—230 |
| 3,328,596 | 6/1967 | Germann et al. | 321—45 XR |

WARREN E. RAY, *Primary Examiner.*

W. M. SHOOP, *Assistant Examiner.*